United States Patent
Yamada et al.

[11] Patent Number: 6,043,941
[45] Date of Patent: Mar. 28, 2000

[54] IMAGE-FORMING LENS HAVING FOUR LENS ELEMENTS

[75] Inventors: Hiroshi Yamada, Omiya; Akiko Nagahara, Koshigaya, both of Japan

[73] Assignee: Fuji Photo Optical Co., Ltd., Omiya, Japan

[21] Appl. No.: 08/897,763

[22] Filed: Jul. 21, 1997

[30] Foreign Application Priority Data

Jul. 23, 1996 [JP] Japan ................................ 8-213065

[51] Int. Cl.$^7$ ........................... G02B 9/58; G02B 13/04
[52] U.S. Cl. ............................... 359/782; 359/753
[58] Field of Search .................. 359/749–753, 359/763, 770, 771, 782, 686, 754–756, 676, 781

[56] References Cited

U.S. PATENT DOCUMENTS

| | | | |
|---|---|---|---|
| 3,958,864 | 5/1976 | Glatzel | 359/749 |
| 4,310,222 | 1/1982 | Ikemori | 359/708 |
| 4,674,844 | 6/1987 | Nishioka et al. | 359/782 |
| 4,863,250 | 9/1989 | Ishizuka | 359/755 |
| 5,483,380 | 1/1996 | Nozawa | 359/686 |
| 5,559,638 | 9/1996 | Aoki et al. | 359/749 |
| 5,754,345 | 5/1998 | Yamamoto | 359/661 |

*Primary Examiner*—Georgia Epps
*Assistant Examiner*—Jordan M. Schwartz
*Attorney, Agent, or Firm*—Arnold International; Bruce Y. Arnold

[57] ABSTRACT

An image-forming lens having four lens elements of refractive power, in order from the object side, of: negative, positive, positive, and negative. By making the distance from image-side surface of the first element to the image-side surface of the second lens element to be greater than or equal to 0.3 f and less than or equal to 1.5 f, where f is the focal length of the image-forming lens, an image-forming lens having an F# of approximately 2.8 and a picture angle of about 60 degrees is obtained. A diaphragm may be positioned such that the distance along the optical axis from the diaphragm to the object side of the fourth lens is less than or equal to the focal length of the image-forming lens.

9 Claims, 13 Drawing Sheets

IMAGE-FORMING LENS HAVING FOUR LENS ELEMENTS

BACKGROUND OF THE INVENTION

The present invention relates to an image-forming lens. In particular, it relates to an image-forming lens which serves as a photographic lens for use in TV telephones, door phones, video cameras used for monitoring or still video cameras (i.e., digital cameras).

In recent years, there has been much use of solid state photographic image elements, (e.g., CCD arrays) at the image plane of video cameras and digital cameras. These solid state photographic image elements have come to be miniaturized over the years because of progress in technology. Along with this, in the photographic image lens area, utilization has been made of wide angle lenses having a small format.

In addition, with this type of video camera or digital camera, between the photographic lens and the solid state photographic image elements, there has been increasing use of low pass filters that are used to prevent moire, infra-red light shielding filters for correcting the spectral sensitivity of the solid state photographic image elements, and glass covers for protecting the surface of the solid state photographic image elements. In such an instance it has been necessary to increase, to some extent, the back focal length Bf (hereinafter referred to simply as back focus) of the photographic lens in order to allow sufficient space for one or more of these items.

An image-forming lens having four spherical or planar surfaces is disclosed in Japanese Patent Publication No. 5-264895. The disclosed lens is known to eliminate, to some extent, the problems described above. However, according to the construction disclosed, the entire length of the system becomes extremely long, and it is difficult to achieve miniaturization. The image-forming lens disclosed in Japanese Patent Publication No. 8-5908 has two lens elements that are attached in position on the image side. With such a design, there is the problem of a dramatic increase in cost resulting from the attachment of the two lens elements, particularly with a miniature image-forming lens such as described above.

BRIEF SUMMARY OF THE INVENTION

The present invention not only enables a great reduction in cost, but at the same time provides a photographic lens having a back focus that permits filters or a cover to be inserted as discussed above, as well as provides a miniaturized lens having a wide half-picture angle with a bright image.

BRIEF DESCRIPTION OF THE DRAWINGS

The present invention will become more fully understood from the detailed description given below and the accompanying drawings which are given by way of illustration only, and thus, are not limitative of the present invention and wherein.

DETAILED DESCRIPTION

A detailed description of various embodiments of the present invention is given below, with reference to the drawings.

Figure 1:
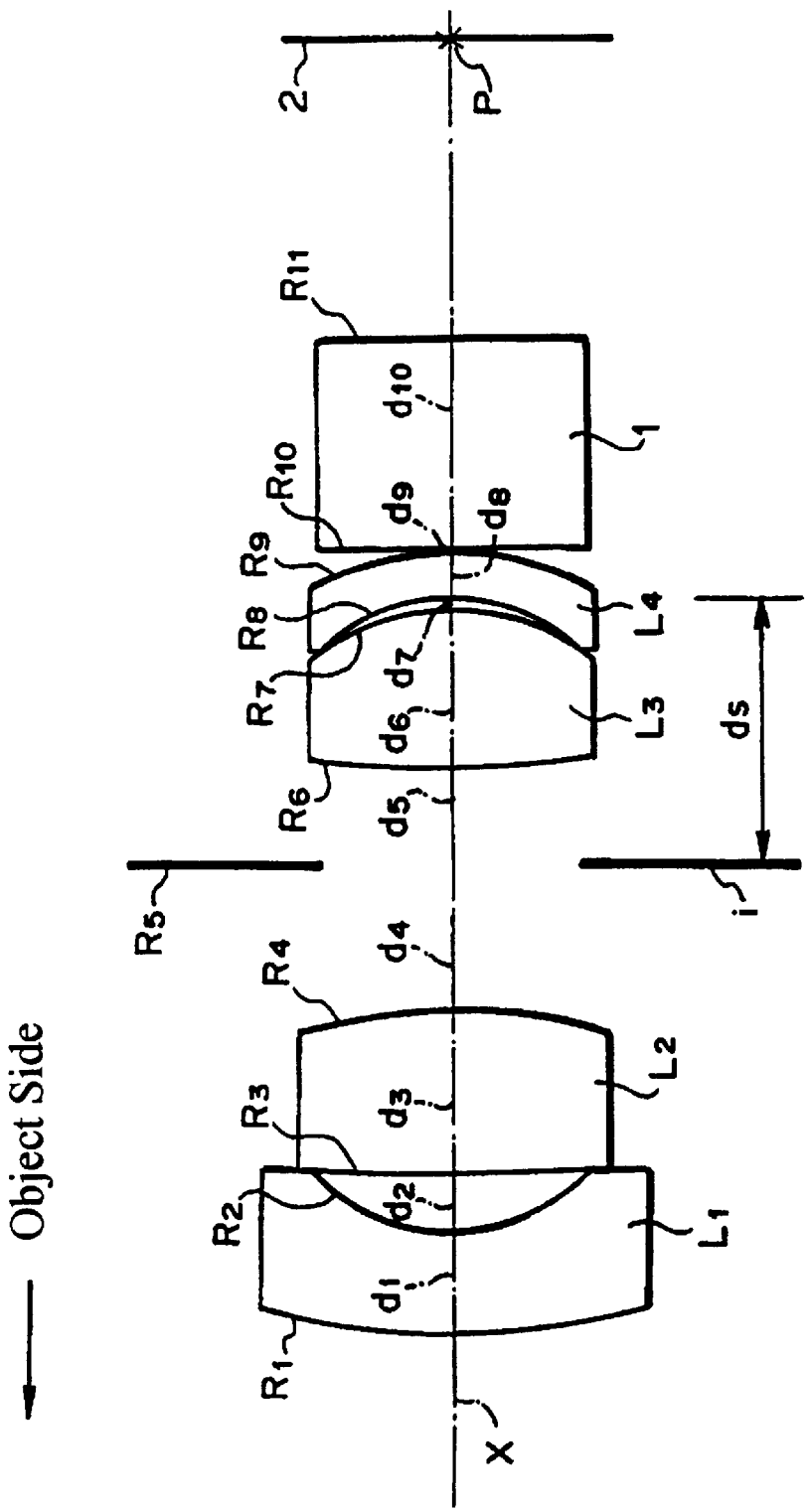
FIG. 1 is a summary diagram which shows the basic lens construction relating directly to embodiment 1 and indirectly to embodiments 2–6 of the present invention.
Figure 2:
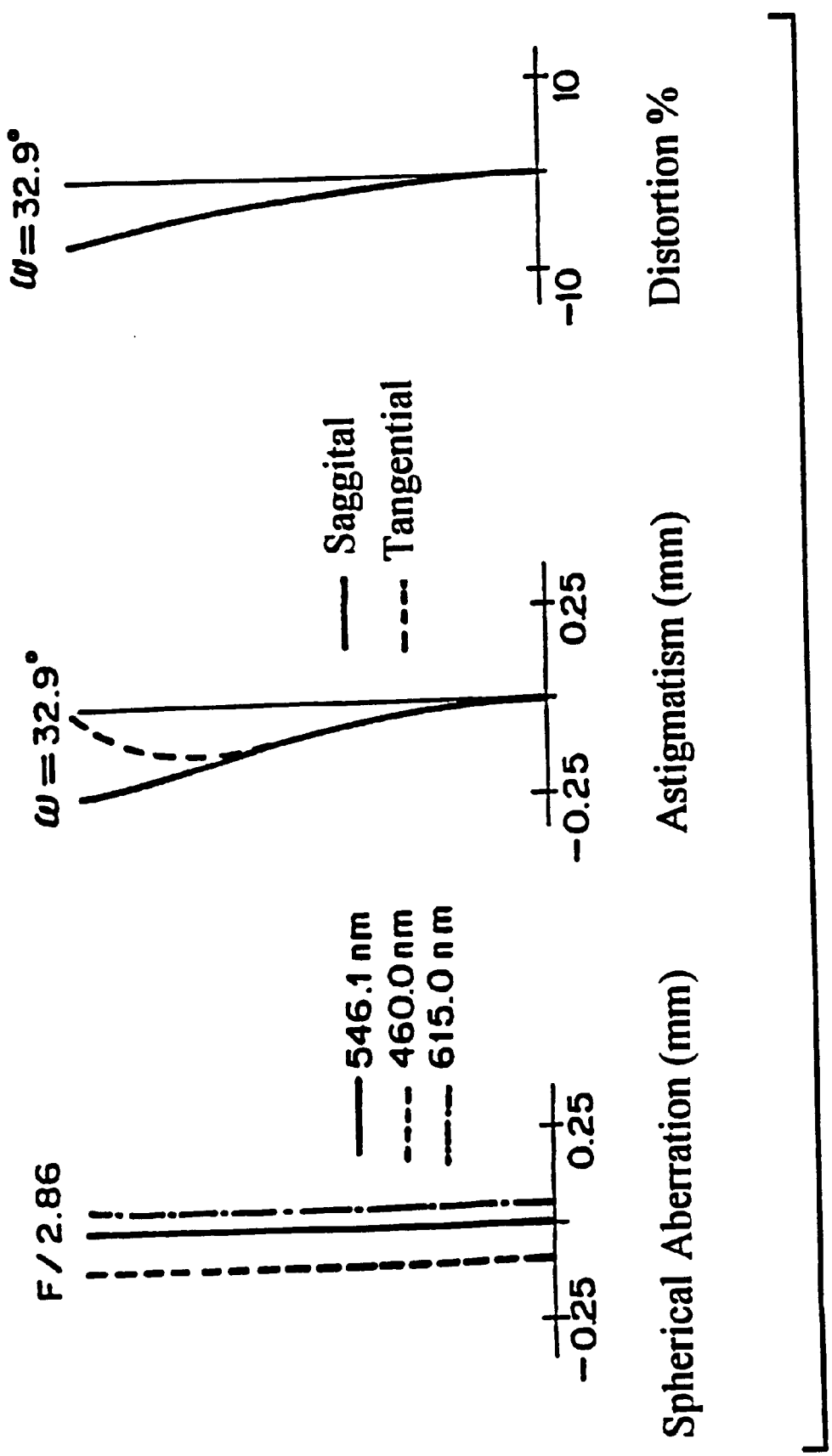
FIG. 2 shows the spherical aberration, astigmatism, and distortion of the lens of embodiment 1.
Figure 3:
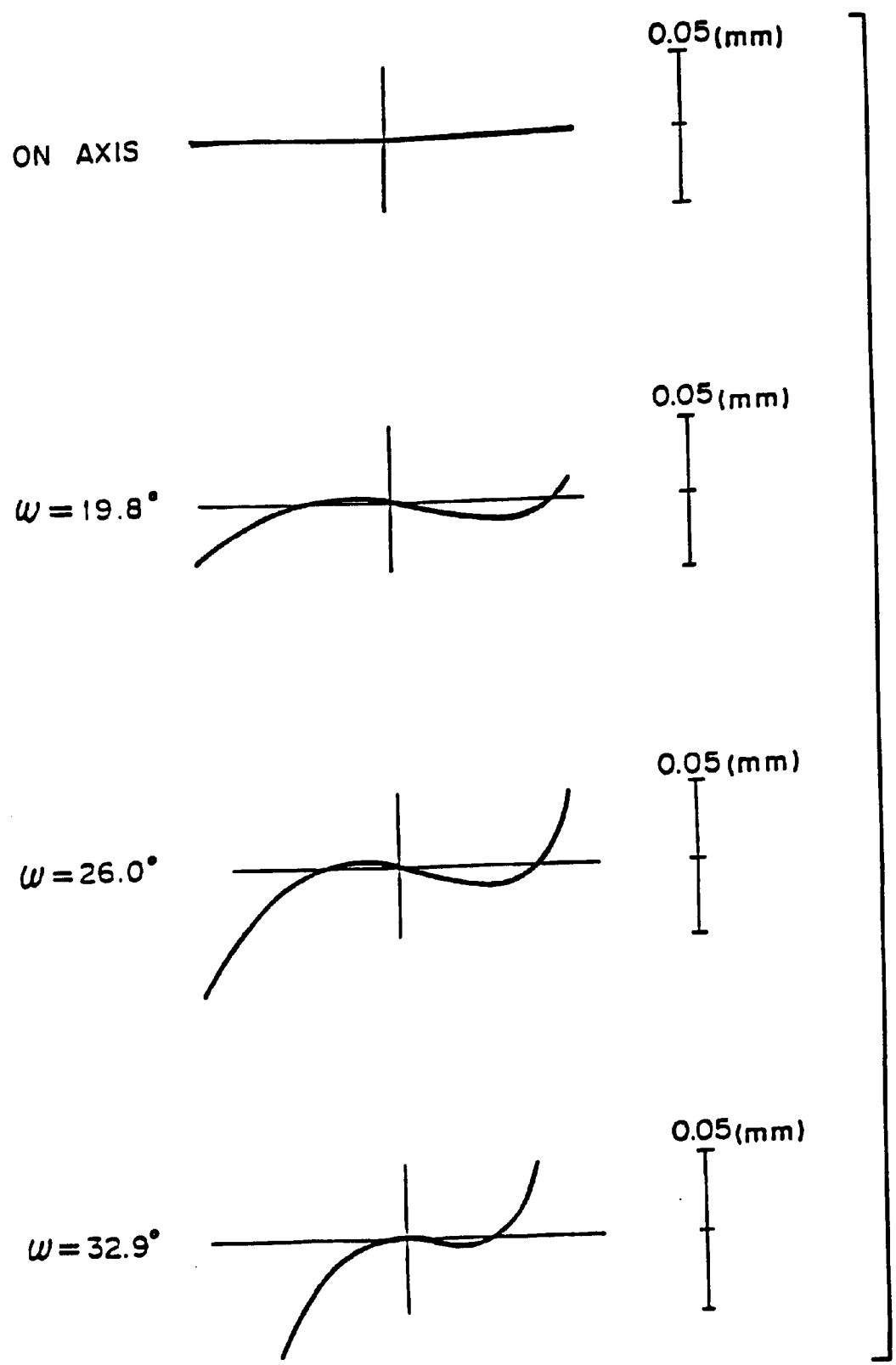
FIG. 3 illustrates the coma of the lens of embodiment 1.
Figure 4:
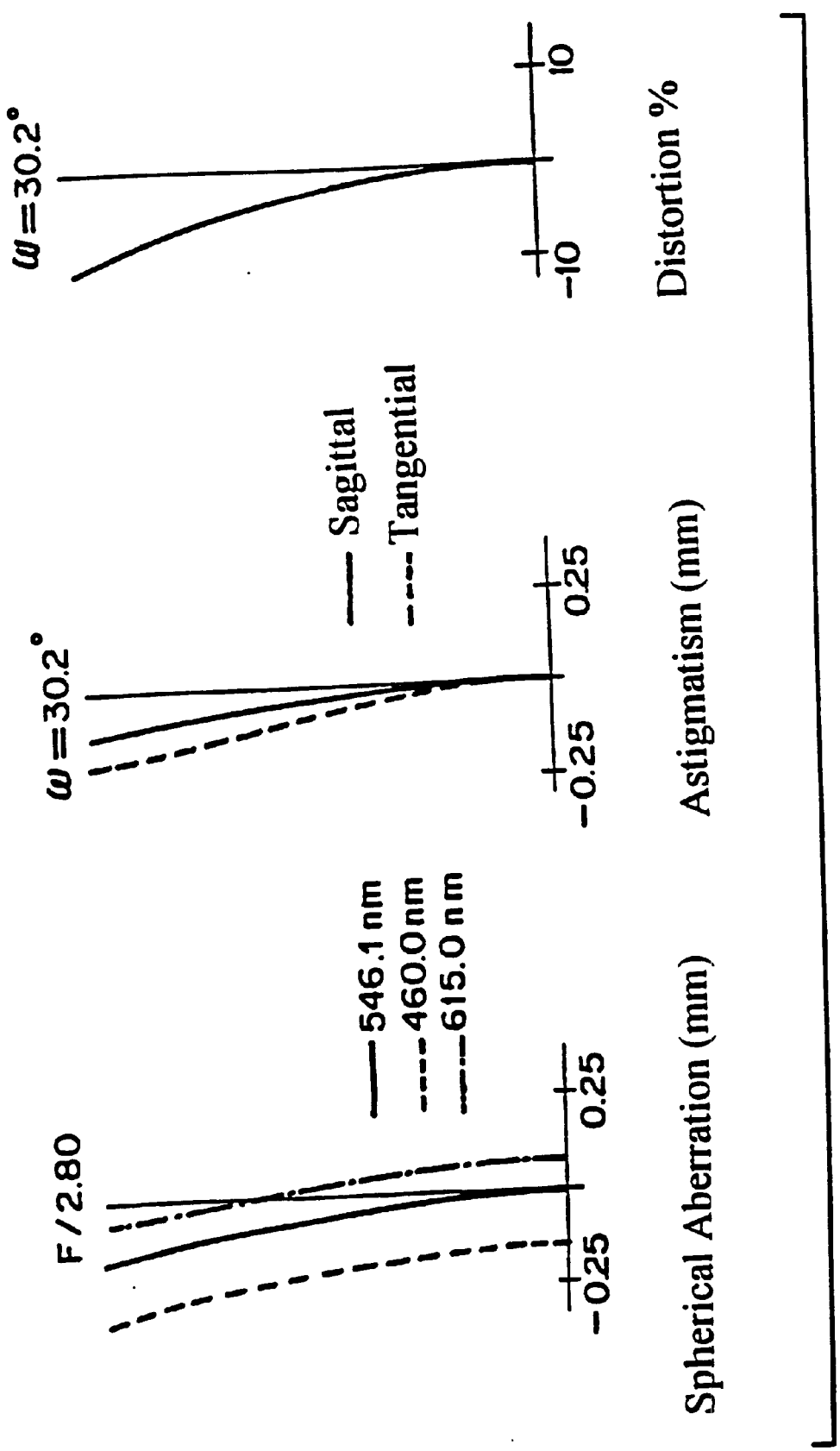
FIG. 4 shows the spherical aberration, astigmatism, and distortion of the lens of embodiment 2.
Figure 5:
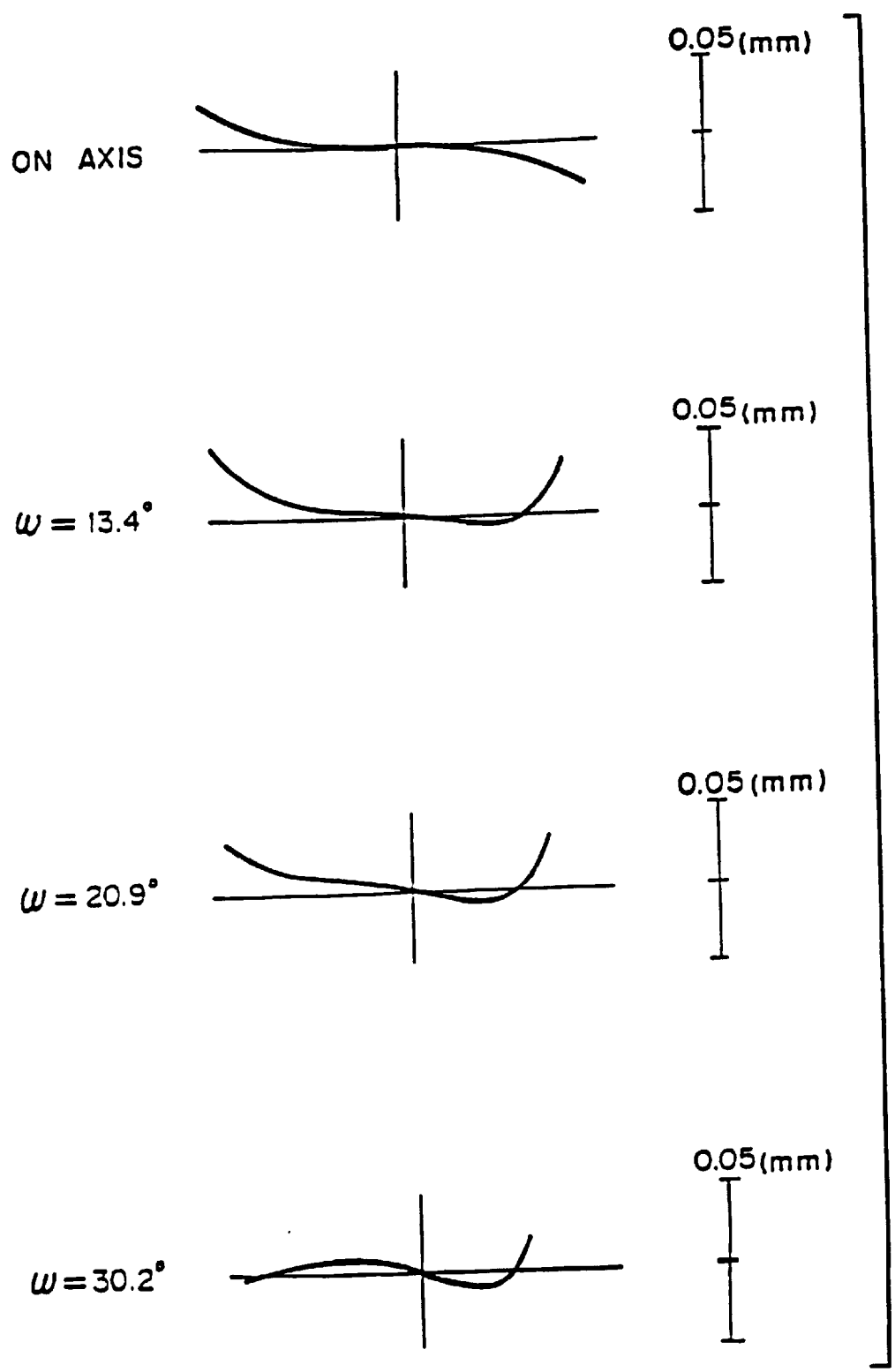
FIG. 5 illustrates the coma of the lens of embodiment 2.
Figure 6:
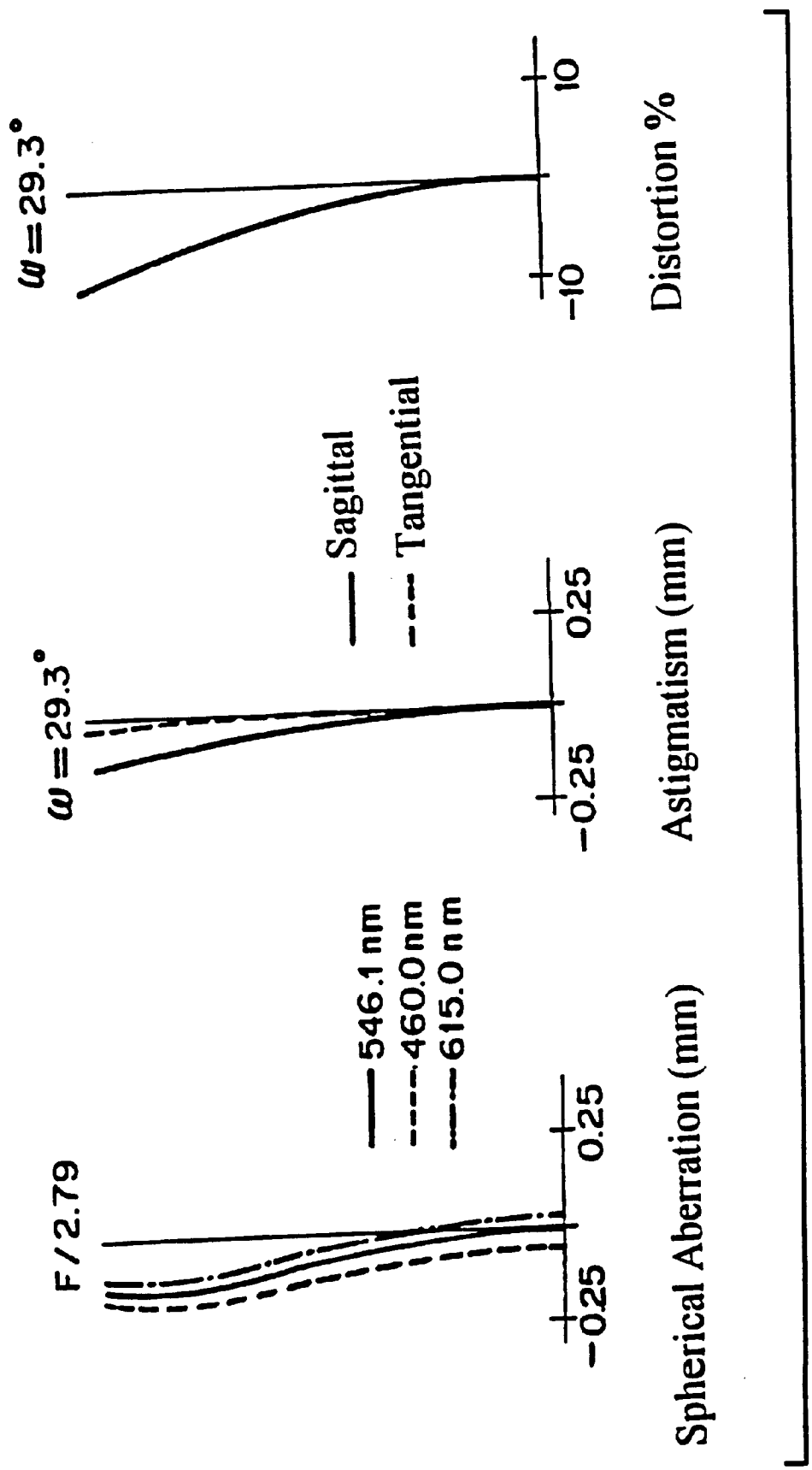
FIG. 6 shows the spherical aberration, astigmatism, and distortion of the lens of embodiment 3.
Figure 7:
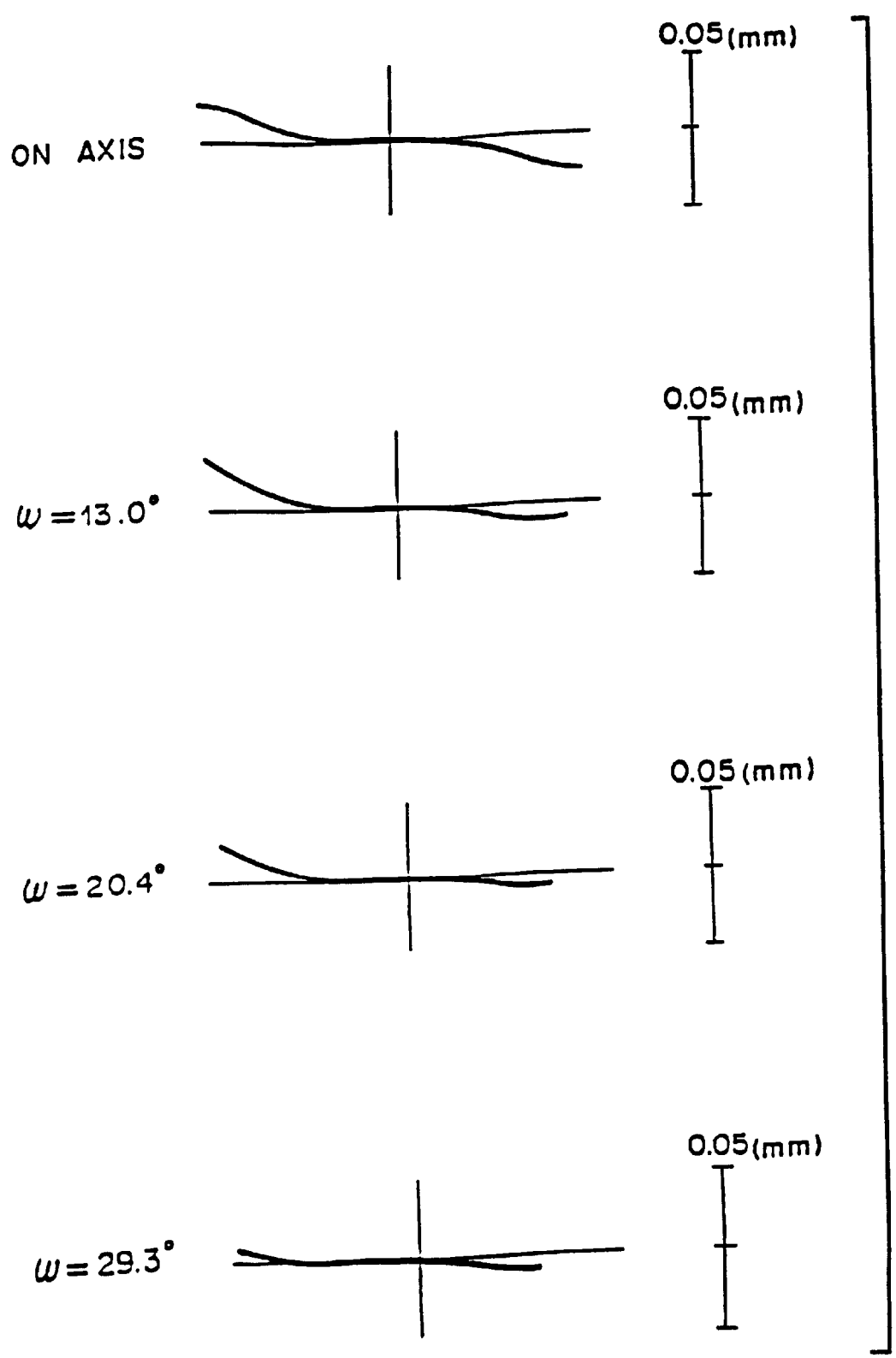
FIG. 7 illustrates the coma of the lens of embodiment 3.
Figure 8:
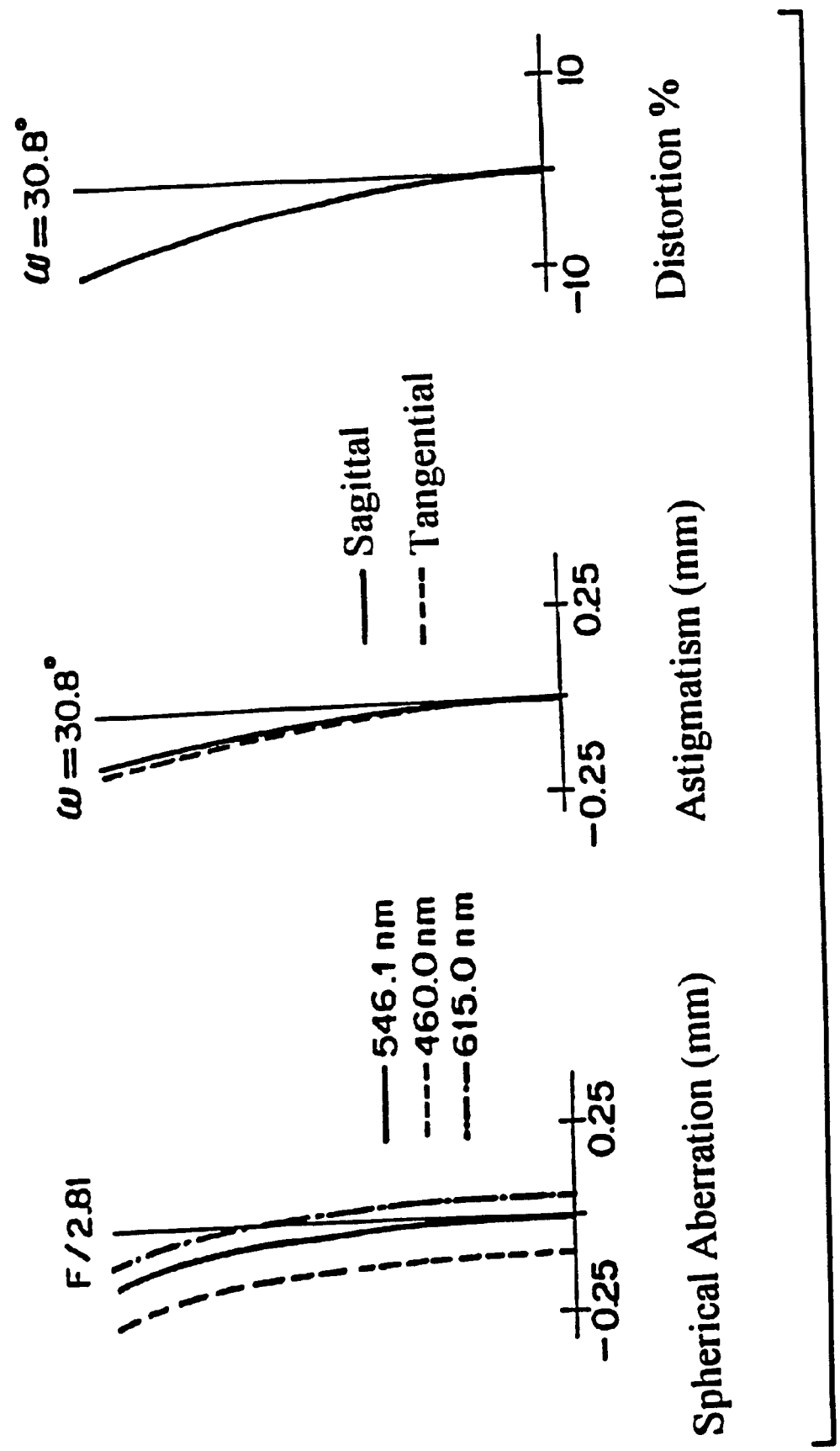
FIG. 8 shows the spherical aberration, astigmatism, and distortion of the lens of embodiment 4.
Figure 9:
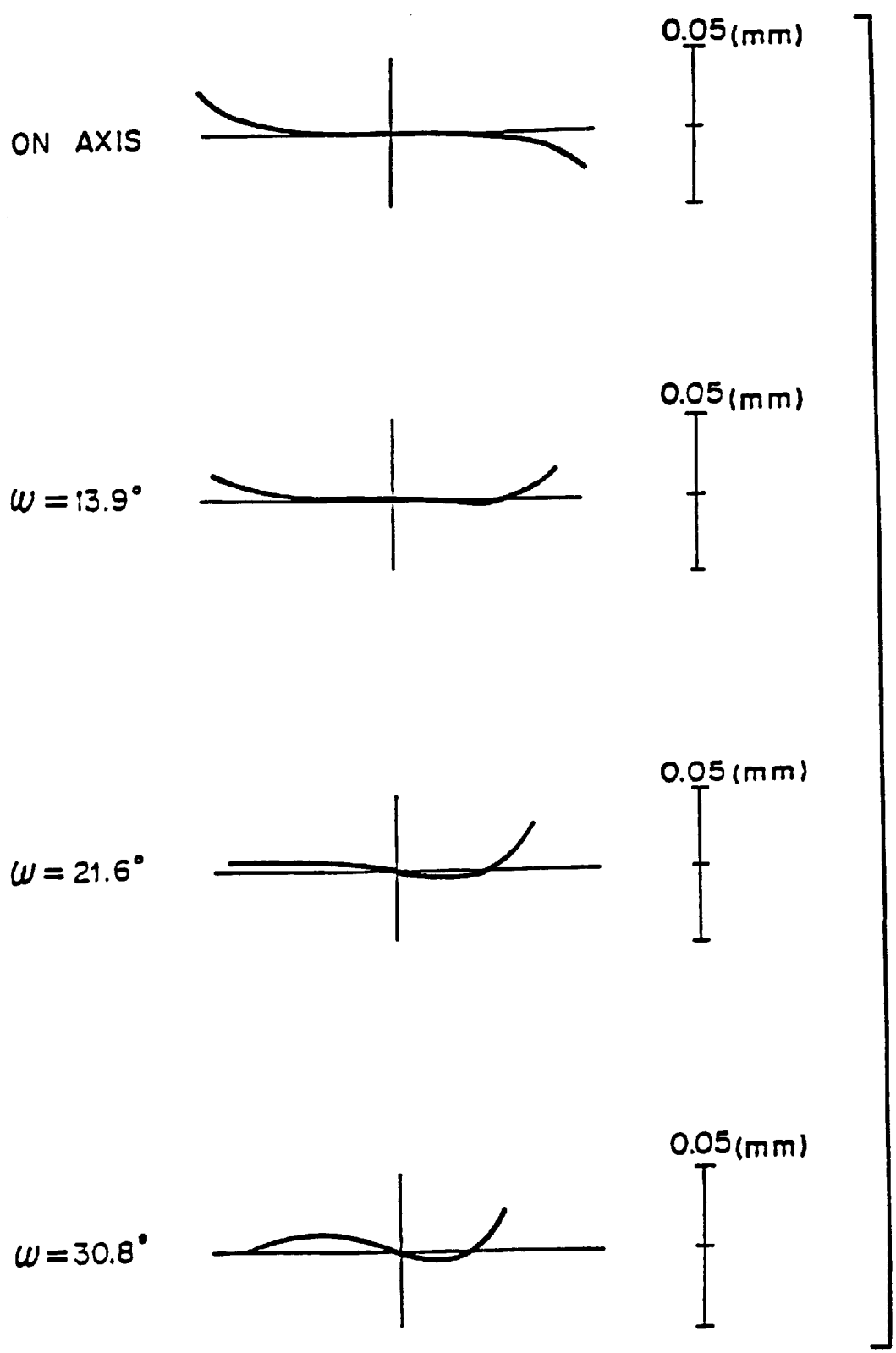
FIG. 9 illustrates the coma of the lens of embodiment 4.
Figure 10:
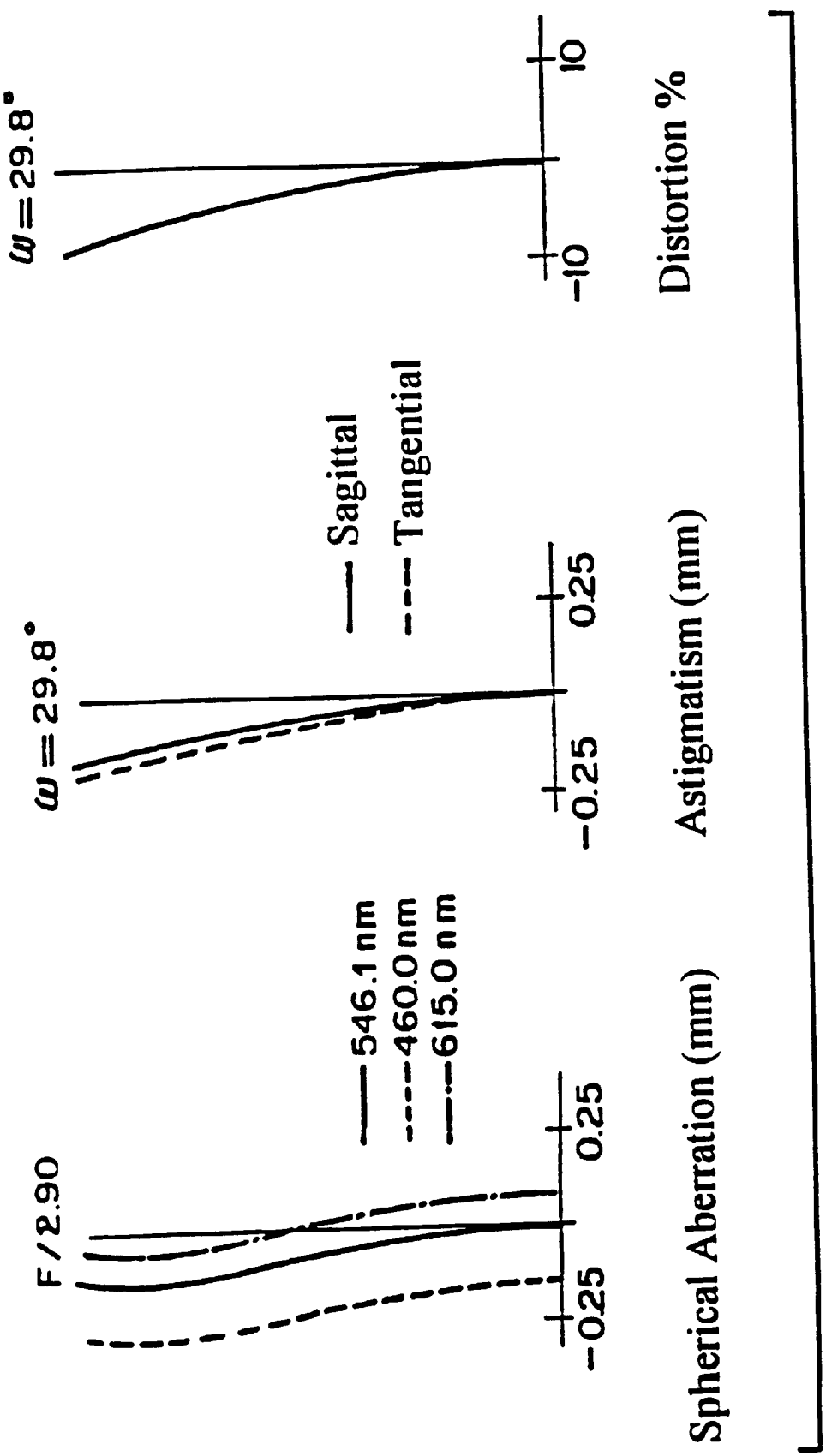
FIG. 10 shows the spherical aberration, astigmatism, and distortion of the lens of embodiment 5.
Figure 11:
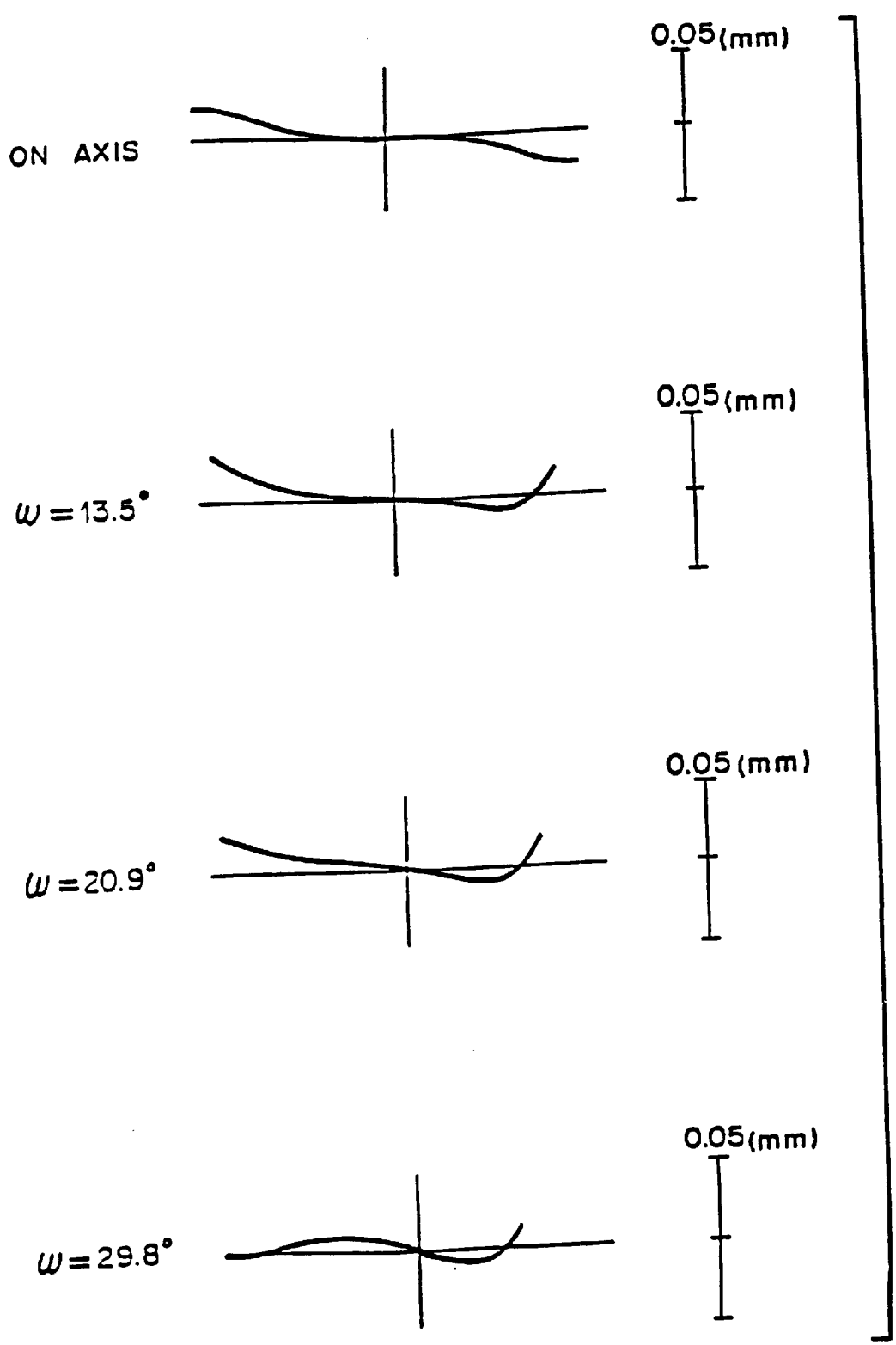
FIG. 11 illustrates the coma of the lens of embodiment 5.
Figure 12:
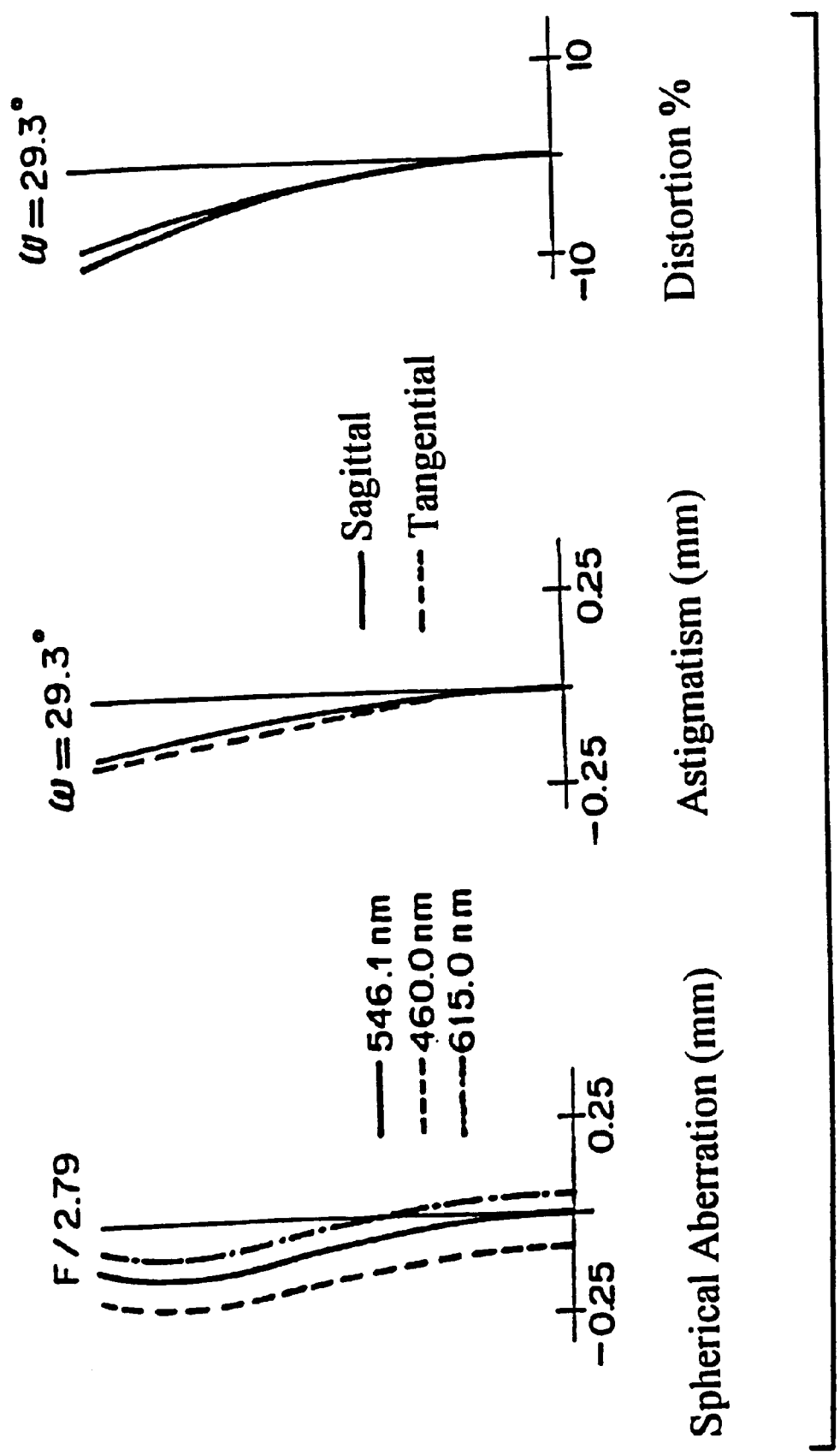
FIG. 12 shows the spherical aberration, astigmatism, and distortion of the lens of embodiment 6; and, FIG. 13 illustrates the coma of the lens of embodiment 6.
Figure 13:
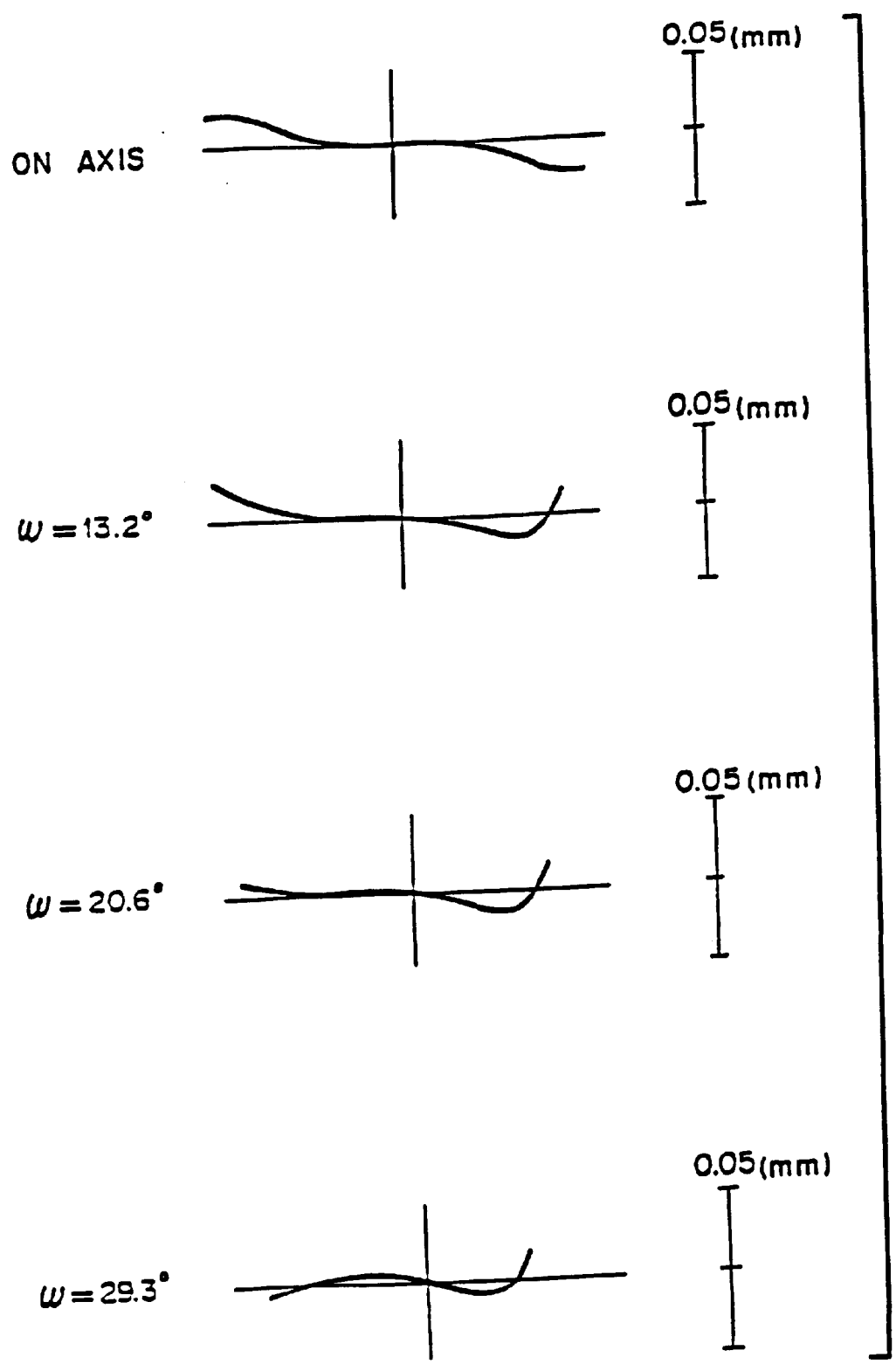

A retro-focus type lens, such as that shown in FIG. 1, is utilized in embodiments 1–6 in order to enable the resultant back focus to be lengthened, while at the same time providing a wide viewing angle.

As shown in FIG. 1, the image-forming lens relating to embodiments 1–6 comprises four lens elements which are arranged, in order from the object side, as follows: a negative first lens element $L_1$, a positive second lens element $L_2$, a positive third lens element $L_3$, and a negative fourth lens element $L_4$. The opposite surfaces of the second lens element $L_2$ have different curvatures and this lens element is always oriented with its stronger curvature surface on the image side in order to correct for distortion and astigmatism while providing a back focus of adequate length. Opposite surfaces of the third lens element have different curvatures and this element is oriented with its stronger curvature on the image side. The fourth lens element $L_4$ is a meniscus lens having its convex surface on the image side. The four lens elements according to the present invention are additionally constructed and arranged so as to satisfy the following conditional equation:

$$0.3 \leq (d_2 + d_3)/f \leq 1.5 \qquad \text{(condition \#1)}$$

wherein, $d_2$ is the air gap, along the optical axis X, between the image side surface of the first lens element $L_1$ and the object side surface of the second lens element $L_2$, $d_3$ is the lens thickness, along the optical axis X, of the second lens element $L_2$, and f is the focal length of image-forming lens.

In addition to satisfying condition #1, above, it is desirable if the following conditional equation is also satisfied:

$$d_s/f \leq 1.0 \qquad \text{(condition \#2)}$$

wherein, $d_s$ is the distance, along the optical axis X, from the position of diaphragm i to the object side surface of the fourth lens element $L_4$.

A description is provided hereinafter with regard to embodiments 1–6, utilizing practical numerical values.

EMBODIMENT 1

The image-forming lens according to this embodiment employs, as the first lens element $L_1$, a negative meniscus lens having its convex surface on the object side. As the second lens element $L_2$, a bi-convex lens having opposite surfaces of different refractive power is used, with the surface of strongest curvature on the image side. The negative meniscus lens that comprises the fourth lens element $L_4$ is oriented with its convex surface on the image side. Furthermore, a diaphragm i is installed between the second lens element $L_2$ and the third lens element $L_3$. Thus, incident light rays on the object side which lie on the X axis are imaged at the position P on the light receiving surface of the solid state photographic image elements 2, after passing through a low pass filter 1.

By satisfying the conditions #1 and #2 above, coma and chromatic aberration are corrected, and the overall lens length can be shortened, thereby obtaining adequate performance. In other words, if $(d_2+d_3)/f$ exceeds 1.5, the overall lens body becomes longer, and miniaturization becomes difficult. On the other hand, if $(d_2+d_3)/f$ falls below 0.3, then coma and chromatic aberration cannot be well-corrected, and it becomes difficult to obtain a bright image. In addition, if the distortion becomes too small, a sufficient picture angle will not be obtained, and the back focus will also become short.

In addition, with the image-forming lens of embodiment 1 as well as with embodiments 2–6, if the lens is constructed to satisfy condition #2 above, the incident angle of the light relative to the object side surface of the fourth lens element $L_4$ is advantageously controlled by the diaphragm, which thus serves as a stop to sharpen the image.

Table 1 below shows the radius R of each lens element surface, the center thickness d (of solid material or air, as the case may be) between each lens element surface, the index of refraction n (for the sodium e spectral line), and the Abbe number ν of each lens element. (In Table 1–6 below, the surfaces are numbered in order from the object side, and distances are in mm.)

TABLE 1

| Surface | R | d | n | ν |
|---|---|---|---|---|
| 1 | 11.435 | 0.9 | 1.59142 | 61.0 |
| 2 | 3.580 | 1.5 | | |
| 3 | 40.818 | 3.0 | 1.83929 | 37.1 |
| 4 | −11.551 | 2.7 | | |
| 5 | (diaphragm) | 1.8 | | |
| 6 | 16.652 | 2.8 | 1.83962 | 42.7 |
| 7 | −4.436 | 0.3 | | |
| 8 | −3.446 | 0.8 | 1.85504 | 23.6 |
| 9 | −5.153 | 4.0 | | |
| 10 | ∞ | 2.1 | 1.51872 | 64.0 |
| 11 | ∞ | | | | f = 5.11 mm  Bf = 5.33 mm  F# = 2.86  ω = 32.9°
$(d_2 + d_3)/f = 0.88$   $d_s/f = 0.96$

Furthermore, in embodiment 1, as shown in the lower section of Table 1, the focal length f of the image-forming lens is 5.11 mm, the back focus is 5.33 mm, the F# is 2.86, and the half picture angle ω is 32.9°. In addition, the value of $(d_2+d_3)/f$ is 0.88, and the value of $d_s/f$ is 0.96, thereby satisfying each of conditions #1 and #2 above.

EMBODIMENT 2

The image-forming lens of embodiment 2 has approximately the same construction as the image-forming lens of embodiment 1. The primary differences are, in this embodiment, the first lens element $L_1$ is a bi-concave lens having different surface curvatures on its opposite sides. (As in each of embodiments 1–6, the first lens element $L_1$ is oriented with its stronger curvature on the image side.) Also, the second lens element $L_2$ differs in that, in this embodiment, it is a plano-convex lens.

Table 2 below shows the radius R of each lens element surface, the center thickness d (of solid material or air, as the case may be) between each lens element surface, the index of refraction n (for the sodium e spectral line), and the Abbe number ν of each lens element.

TABLE 2

| Surface | R | d | n | ν |
|---|---|---|---|---|
| 1 | −39.943 | 0.9 | 1.60661 | 42.0 |
| 2 | 3.967 | 0.8 | | |
| 3 | ∞ | 1.5 | 1.85504 | 23.6 |
| 4 | −10.182 | 2.9 | | |
| 5 | (diaphragm) | 1.9 | | |
| 6 | 46.772 | 2.1 | 1.80831 | 46.3 |
| 7 | −4.149 | 0.3 | | |
| 8 | −3.488 | 0.6 | 1.85504 | 23.6 |
| 9 | −5.134 | 0.0 | | |
| 10 | ∞ | 4.2 | 1.51825 | 63.8 |
| 11 | ∞ | | | | f = 6.05 mm  Bf = 9.41 mm  F# = 2.8  ω = 30.2°
$(d_2 + d_3)/f = 0.38$   $d_s/f = 0.71$

Furthermore, in embodiment 2, as shown in the lower section of Table 2, the focal length f of the image-forming lens is 6.05 mm, the back focus Bf is 9.41 mm, the F# is 2.8, and the half picture angle ω is 30.2°. In addition, the value of $(d_2+d_3)/f$ is 0.38, and the value of $d_s/f$ is 0.71, thereby satisfying each of conditions #1 and #2 above.

EMBODIMENT 3

The image-forming lens of embodiment 3 is constructed in approximately the same manner as is the image-forming lens of embodiment 1. It differs primarily in that, in this embodiment, the second lens element $L_2$ is a positive meniscus lens.

Table 3 below shows the radius R of each lens element surface, the center thickness d (of solid material or air, as the case may be) between each lens element surface, the index of refraction n (for the sodium e spectral line), and the Abbe number ν of each lens element.

TABLE 3

| Surface | R | d | n | ν |
|---|---|---|---|---|
| 1 | 5.990 | 0.9 | 1.46618 | 65.6 |
| 2 | 3.446 | 3.1 | | |
| 3 | −147.981 | 1.5 | 1.85504 | 23.6 |
| 4 | −118.336 | 3.0 | | |
| 5 | (diaphragm) | 1.3 | | |
| 6 | 24.438 | 2.0 | 1.80831 | 46.3 |
| 7 | −3.904 | 0.1 | | |
| 8 | −3.566 | 0.6 | 1.85504 | 23.6 |
| 9 | −5.684 | 0.0 | | |
| 10 | ∞ | 4.2 | 1.51825 | 63.8 |
| 11 | ∞ | | | | f = 6.20 mm  Bf = 8.45 mm  F# = 2.79  ω = 29.3°
$(d_2 + d_3)/f = 0.75$   $d_s/f = 0.55$

Furthermore, in embodiment 3, as shown in the lower section of Table 3, the focal length f of the image-forming lens is 6.20 mm, the back focus Bf is 8.45 mm, the F# is 2.79, and the half picture angle ω is 29.3°. In addition, the value of $(d_2+d_3)/f$ is 0.75, and the value of $d_s/f$ is 0.55, thereby satisfying each of conditions #1 and #2 above.

EMBODIMENT 4

The image-forming lens of embodiment 4 is constructed approximately the same as the image-forming lens of embodiment 1. It differs primarily in that, in this embodiment, the second lens element $L_2$ is a plano-convex lens.

Table 4 shows the radius R of each lens element surface, the center thickness d (of solid material or air, as the case may be) between each lens element surface, the index of refraction n (for the sodium e spectral line), and the Abbe number ν of each lens element.

TABLE 4

| Surface | R | d | n | ν |
|---|---|---|---|---|
| 1 | 14.710 | 1.9 | 1.51825 | 63.8 |
| 2 | 3.466 | 4.0 | | |
| 3 | ∞ | 3.0 | 1.92764 | 21.3 |
| 4 | −15.678 | 0.8 | | |
| 5 | (Diaphragm) | 2.0 | | |
| 6 | 22.077 | 3.0 | 1.73234 | 54.4 |
| 7 | −4.134 | 0.3 | | |
| 8 | −3.606 | 0.6 | 1.92764 | 21.3 |
| 9 | −5.756 | 0.0 | | |
| 10 | ∞ | 4.2 | 1.51825 | 63.8 |
| 11 | ∞ | | | |
| f = 5.81 mm | Bf = 8.52 mm | F# = 2.81 | | ω = 30.8° |
| | $(d_2 + d_3)/f = 1.20$ | | $d_s/f = 0.91$ | |

Furthermore, in embodiment 4, as shown in the lower section of table 4, the focal length f of the image-forming lens is 5.81 mm, the back focus Bf is 8.52 mm, the F# is 2.81, and the half picture angle ω is 30.8°. In addition, the value of $(d_2+d_3)/f$ is 1.20 and the value of $d_s/f$ is 0.91, thereby satisfying each of conditions #1 and #2 above.

EMBODIMENT 5

The image-forming lens of embodiment 5 is constructed approximately the same as the image-forming lens of embodiment 1. However, it differs primarily in that the first lens element $L_1$ is a plano-concave lens and the second lens element $L_2$ is a plano-convex lens.

Table 5 below shows the radius R of each lens element surface, the center thickness d (of solid material or air, as the case may be) between each lens element surface, the index of refraction n (for the sodium e spectral line), and the Abbe number ν of each lens element.

TABLE 5

| Surface | R | d | n | ν |
|---|---|---|---|---|
| 1 | ∞ | 0.9 | 1.48915 | 70.2 |
| 2 | 4.053 | 0.9 | | |
| 3 | ∞ | 2.4 | 1.85504 | 23.6 |
| 4 | −12.349 | 3.0 | | |
| 5 | (Diaphragm) | 2.0 | | |
| 6 | 294.609 | 2.3 | 1.80831 | 46.3 |
| 7 | −4.005 | 0.2 | | |
| 8 | −3.446 | 0.6 | 1.85504 | 23.6 |
| 9 | −4.917 | 0.0 | | |
| 10 | ∞ | 4.2 | 1.51825 | 63.8 |
| 11 | ∞ | | | |
| f = 5.99 mm | Bf = 8.71 mm | F# = 2.90 | | ω = 29.8° |
| | $(d_2 + d_3)/f = 0.56$ | | $d_s/f = 0.75$ | |

Furthermore in the embodiment 5, the focal length f of the image-forming lens is 5.99 mm, the back focus Bf is 8.71 mm, the F# is 2.90, and the half picture angle ω is 29.8°. In addition, the value of $(d_2+d_3)/f$ is 0.56, and the value of $d_s/f$ is 0.75, thereby satisfying conditions #1 and #2 above.

EMBODIMENT 6

The image-forming lens of embodiment 6 is constructed approximately the same as the image-forming lens of embodiment 1. It differs primarily in that the second lens element $L_2$ is a positive meniscus lens.

Table 6 below shows the radius R of each lens element surface, the center thickness d (of solid material or air, as the case may be) between each lens element surface, the index of refraction n (for the sodium e spectral line), and the Abbe number ν of each lens element.

TABLE 6

| Surface | R | d | n | ν |
|---|---|---|---|---|
| 1 | 8.033 | 2.1 | 1.84224 | 41.8 |
| 2 | 3.548 | 1.2 | | |
| 3 | −987.270 | 1.5 | 1.85504 | 23.6 |
| 4 | −26.373 | 3.4 | | |
| 5 | (diaphragm) | 2.2 | | |
| 6 | 25.892 | 2.0 | 1.80831 | 46.3 |
| 7 | −4.003 | 0.2 | | |
| 8 | −3.495 | 0.6 | 1.85504 | 23.6 |
| 9 | −5.249 | 0.0 | | |
| 10 | ∞ | 4.2 | 1.51825 | 63.8 |
| 11 | ∞ | | | |
| f = 6.10 mm | Bf = 9.00 mm | F# = 2.79 | | ω = 29.3° |
| | $(d_2 + d_3)/f = 0.44$ | | $d_s/f = 0.72$ | |

Furthermore, in embodiment 6, as shown in the lower section of Table 6, the focal length f of the image-forming lens is 6.10 mm, the back focus Bf is 9.00 mm, the F# is 2.79, and the half picture angle ω is 29.3 degrees. In addition, the value of $(d_2+d_3)/f$ is 0.44, the value of $d_s/f$ is 0.72, thereby satisfying each of conditions #1 and #2 above.

Next, the spherical aberration, astigmatism, and distortion for embodiments 1–6 are shown in the respective FIGS. 2, 4, 6, 8, 10, and 12. In addition, the coma for embodiments 1–6 are respectively shown in FIGS. 3, 5, 7, 9, 11, and 13. In these aberration diagrams, ω is the half-picture angle. As is clear in FIGS. 2–13, pertaining to embodiments 1–6, each of the illustrated aberrations can be sufficiently corrected to produce an image-forming lens according to the invention.

Furthermore, between the image-forming lens and the light receiving surface of the solid state photographic image elements, either in lieu of a low pass filter or in combination with such a filter, there is sufficient room to accommodate an infra-red shielding filter or a glass cover.

As explained above, according to the present invention, four lens elements are used to form an image-forming lens. Further, by maintaining the distance along the optical axis from the image side of the first lens element to the image side of the second lens element within a specified range, the F# can be made as low as 2.8, and the half-picture angle can be as much as 30.2 degrees, as in embodiment 2. Furthermore, a design according to the conditions #1 and #2 above allows the construction cost to be greatly reduced and the image-forming lens to be miniaturized. Furthermore, the back focus of the image-forming lens can be made long while attaining a high resolving power which permits the lens to be extremely suitable for use as a photographic lens for video cameras for observation or still video cameras.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fixed focal length image-forming retro-focus lens comprising:

four lens elements, each an individual mass separated by air with no additional lens element between said four lens elements, said four lens elements each having a refractive power and arranged, in order from the object side, as a negative first lens element, a positive second lens element, a positive third lens element, and a negative fourth lens element;

wherein, opposite surfaces of the second lens element have different curvatures and said second lens element is oriented with its stronger curvature surface on the image side;

opposite surfaces of the third lens element have different curvatures and said third lens element is oriented with its stronger curvature surface on the image side;

said fourth lens element is a meniscus lens having its convex surface on the image side; and said negative first lens element is the lens element having refractive power that is positioned nearest the object side of said fixed focal length image-forming retrofocus lens.

2. The image-forming lens of claim 1, said four lens elements being constructed and arranged so as to satisfy the following conditional equation:

$$0.3 \leq (d_2 + d_3)/f \leq 1.5$$

wherein, $d_2$ is the air gap between the first lens element and the second lens element, $d_3$ is the lens thickness of the second lens element, and f is the focal length of the image-forming lens.

3. The image-forming lens of claim 2, and further comprising: a diaphragm positioned so that the distance from the diaphragm to the object side of the fourth lens element is less than or equal to the focal length of the image-forming lens.

4. The image-forming lens of claim 1, and further comprising said image-forming lens having the following construction parameters, in order from the object side:

| Surface | R | d | n | ν |
|---------|---|---|---|---|
| 1 | 11.435 | 0.9 | 1.59142 | 61.0 |
| 2 | 3.580 | 1.5 | | |
| 3 | 40.818 | 3.0 | 1.83929 | 37.1 |
| 4 | −11.551 | 2.7 | | |
| 5 | (diaphragm) | 1.8 | | |
| 6 | 16.652 | 2.8 | 1.83962 | 42.7 |
| 7 | −4.436 | 0.3 | | |
| 8 | −3.446 | 0.8 | 1.85504 | 23.6 |
| 9 | −5.153 | 4.0 | | |
| 10 | ∞ | 2.1 | 1.51872 | 64.0 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

5. The image-forming lens of claim 1, and further comprising said image-forming lens having the following construction parameters, in order from the object side:

| Surface | R | d | n | ν |
|---------|---|---|---|---|
| 1 | −39.943 | 0.9 | 1.60661 | 42.0 |
| 2 | 3.967 | 0.8 | | |
| 3 | ∞ | 1.5 | 1.85504 | 23.6 |
| 4 | −10.182 | 2.9 | | |
| 5 | (diaphragm) | 1.9 | | |
| 6 | 46.772 | 2.1 | 1.80831 | 46.3 |
| 7 | −4.149 | 0.3 | | |
| 8 | −3.488 | 0.6 | 1.85504 | 23.6 |
| 9 | −5.134 | 0.0 | | |
| 10 | ∞ | 4.2 | 1.51825 | 63.8 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

6. The image-forming lens of claim 1, and further comprising said image-forming lens having the following construction parameters, in order from the object side:

| Surface | R | d | n | ν |
|---------|---|---|---|---|
| 1 | 5.990 | 0.9 | 1.46618 | 65.6 |
| 2 | 3.446 | 3.1 | | |
| 3 | −147.981 | 1.5 | 1.85504 | 23.6 |
| 4 | −118.336 | 3.0 | | |
| 5 | (diaphragm) | 1.3 | | |
| 6 | 24.438 | 2.0 | 1.80831 | 46.3 |
| 7 | −3.904 | 0.1 | | |
| 8 | −3.566 | 0.6 | 1.85504 | 23.6 |
| 9 | −5.684 | 0.0 | | |
| 10 | ∞ | 4.2 | 1.51825 | 63.8 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

7. The image-forming lens of claim 1, and further comprising said image-forming lens having the following construction parameters, in order from the object side:

| Surface | R | d | n | ν |
|---------|---|---|---|---|
| 1 | 14.710 | 1.9 | 1.51825 | 63.8 |
| 2 | 3.466 | 4.0 | | |
| 3 | ∞ | 3.0 | 1.92764 | 21.3 |
| 4 | −15.678 | 0.8 | | |
| 5 | (Diaphragm) | 2.0 | | |
| 6 | 22.077 | 3.0 | 1.73234 | 54.4 |
| 7 | −4.134 | 0.3 | | |
| 8 | −3.606 | 0.6 | 1.92764 | 21.3 |
| 9 | −5.756 | 0.0 | | |
| 10 | ∞ | 4.2 | 1.51825 | 63.8 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

8. The image-forming lens of claim 1, and further comprising said image-forming lens having the following construction parameters, in order from the object side:

| Surface | R | d | n | ν |
|---|---|---|---|---|
| 1 | ∞ | 0.9 | 1.48915 | 70.2 |
| 2 | 4.053 | 0.9 | | |
| 3 | ∞ | 2.4 | 1.85504 | 23.6 |
| 4 | −12.349 | 3.0 | | |
| 5 | (Diaphragm) | 2.0 | | |
| 6 | 294.609 | 2.3 | 1.80831 | 46.3 |
| 7 | −4.005 | 0.2 | | |
| 8 | −3.446 | 0.6 | 1.85504 | 23.6 |
| 9 | −4.917 | 0.0 | | |
| 10 | ∞ | 4.2 | 1.51825 | 63.8 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

9. The image-forming lens of claim 1, and further comprising said image-forming lens having the following construction parameters:

| Surface | R | d | n | ν |
|---|---|---|---|---|
| 1 | 8.033 | 2.1 | 1.84224 | 41.8 |
| 2 | 3.548 | 1.2 | | |
| 3 | −987.270 | 1.5 | 1.85504 | 23.6 |
| 4 | −26.373 | 3.4 | | |
| 5 | (diaphragm) | 2.2 | | |
| 6 | 25.892 | 2.0 | 1.80831 | 46.3 |
| 7 | −4.003 | 0.2 | | |
| 8 | −3.495 | 0.6 | 1.85504 | 23.6 |
| 9 | −5.249 | 0.0 | | |
| 10 | ∞ | 4.2 | 1.51825 | 63.8 |
| 11 | ∞ | | | | where R is the radius of curvature (in mm) of each lens element surface, d is the spacing (in mm) between each lens element surface, n is the index of refraction for the sodium e line of each lens element, and ν is the Abbe number of each lens element.

* * * * *